(12) United States Patent
Wallerstein et al.

(10) Patent No.: US 6,754,008 B1
(45) Date of Patent: Jun. 22, 2004

(54) IMAGING LENS ARRANGEMENT DESIGNED FOR LOW LIGHT CONDITIONS

(75) Inventors: Edward P. Wallerstein, Pleasanton, CA (US); David Nilson, Walnut Creek, CA (US); Bradley W. Rice, Danville, CA (US); Raymond Fraze, Alameda, CA (US)

(73) Assignee: Xenogen Corporation, Alameda, CA (US)

( * ) Notice: Subject to any disclaimer, the term of this patent is extended or adjusted under 35 U.S.C. 154(b) by 212 days.

(21) Appl. No.: 09/955,005

(22) Filed: Sep. 17, 2001

(51) Int. Cl.[7] .................. G02B 15/02; G02B 17/00; G02B 3/00
(52) U.S. Cl. .................. 359/672; 359/676; 396/74; 396/449; 352/142
(58) Field of Search ................ 359/672, 691, 359/692, 676; 396/74, 449, 429; 348/64, 221, 222, 296, 363; 352/142

(56) References Cited

U.S. PATENT DOCUMENTS

| | | | |
|---|---|---|---|
| 2,645,156 A | | 7/1953 | Tronnier .................. 359/786 |
| 3,642,351 A | | 2/1972 | Tronnier et al. ............ 359/757 |
| 3,709,582 A | | 1/1973 | Walker .................... 357/733 |
| 3,877,792 A | | 4/1975 | Cox et al. ................. 357/716 |
| 5,777,798 A | * | 7/1998 | Freedenberg et al. ....... 359/676 |
| 5,801,886 A | * | 9/1998 | Lee ....................... 359/672 |
| 6,037,972 A | * | 3/2000 | Horiuchi et al. ........... 348/64 |
| 6,271,964 B1 | | 8/2001 | Abe ....................... 359/409 |
| 6,359,649 B1 | * | 3/2002 | Suzuki .................... 348/220 |
| 2002/0094202 A1 | * | 7/2002 | Chen ...................... 396/74 |

FOREIGN PATENT DOCUMENTS

| | | | |
|---|---|---|---|
| CH | 346706 | 7/1960 | |
| EP | 1 061 329 A2 | 12/2000 | ........ G01B/11/00 |

* cited by examiner

*Primary Examiner*—Scott J. Sugarman
*Assistant Examiner*—M. Hasan
(74) *Attorney, Agent, or Firm*—Beyer, Weaver & Thomas, LLP.

(57) ABSTRACT

Disclosed is an improved lens system for low light applications. This improved low light lens system is designed for any suitable low light application, such as the above described biological imaging application. In one embodiment, a finite conjugate lens system is disclosed. The lens system includes, in order from a camera side to an object side, a first lens group and a second lens group. The first and second lens groups are adapted so that when light is passed from the object side to the image side, a substantially sized region of collimated light is formed between the first and second lens group. Preferably, the first and second lens groups are adapted to demagnify an object at the object side.

58 Claims, 8 Drawing Sheets

IMAGING LENS ARRANGEMENT DESIGNED FOR LOW LIGHT CONDITIONS

FIELD OF THE INVENTION

The present invention relates generally to imaging lens arrangements. More specifically, the present invention relates to imaging lens systems that provide improved lens properties within a low light environment.

BACKGROUND OF THE INVENTION

Conventional low light lens systems are typically designed for use in cameras. These lenses provide adequate lens properties when the object being imaged is positioned relatively far from the lens (e.g., greater than 600 mm). For example, these conventional low light lens systems have adequate relative illumination at relatively large object-to-lens distances and poor relative illumination characteristics at closer distances (e.g., less than 600 mm). That is, for short distances the illumination collection efficiency varies significantly across the field of view. For instance, conventional lenses typically have only a 70% illumination efficiency across a 26 mm field of view at the image plane. Additionally, certain imaging characteristics are typically sacrificed in the design of a conventional lens system to reduce the costs of manufacturing the lens. For example, the illumination efficiency or "relative illumination" tends to decrease dramatically at the edges of the field of view (commonly referred to as vignetting). Conventional low light lens systems also tend to have significant optical aberration characteristics. Although the non-uniform relative illumination and aberration characteristics of conventional lens systems are not serious problems in certain applications (e.g., photography for hobbyists), these characteristics are unacceptable in other applications.

For instance, conventional lens systems are inadequate for one specialized type of imaging that involves the capture of low intensity light—on the order of individual photons—from a light emitting sample, such as a small animal injected with a luminescent substance. The source of the light indicates portions of the sample where an activity of interest may be taking place, such as the growth of malignant tumors. Specialized in-vivo imaging applications may include one or more representations of emissions from internal portions of a specimen superimposed on a photographic representation of the specimen.

Such imaging applications present particular challenges to the design of the lens system. In this type of application, the object to be imaged is typically positioned relatively close to the lens system (e.g., 200 to 400 mm) so that the relatively small object fills the entire field of view. Additionally, relatively small features of the object are typically examined. For example, a mouse's brain may be examined for tumors. In this type of application where small image features must be accurately distinguished across the entire sample, it is important that the lens system provide substantially constant relative illumination, low vignetting, adequate spatial resolution, and minimal aberration characteristics at relatively close object-to-lens distances. Unfortunately, currently available conventional lens systems fail to meet the needs of many low light applications, such as imaging of a light emitting biological sample.

Accordingly, there is a need for a lens system that has a relatively constant relative illumination and insignificant aberration problems while imaging an object positioned relatively close to the lens system. Of course, it is also preferable to design such lens systems at a reasonable total cost.

SUMMARY OF THE INVENTION

Accordingly, the present invention provides an improved lens system for low light applications. This improved low light lens system is designed for any suitable low light application, such as the above described biological imaging application. In one embodiment, a finite conjugate lens system is disclosed. The lens system includes, in order from a camera side to an object side, a first lens group and a second lens group. The first and/or second lens groups are adapted so that when light is passed from the object side to the image side, a substantially sized region of collimated light is formed between the first and second lens group. Preferably, the first and/or second lens groups are adapted to demagnify an object at the object side.

Preferably, the region of collimated light space is greater than about 25 mm. In one implementation, the region of collimated light space is adapted to receive one or more filter wheel(s). In one aspect, the first and second lens groups are configured to provide a field of view at the image plane having a diameter that is less than or equal to about 36 mm. In a specific implementation, the field of view diameter is less than or equal to 26 mm. Preferably, the lens system also includes a third lens group configured to provide a plurality of demagnification levels. In one implementation, the third lens group includes a plurality of lens sub-groups mounted on a turret. In a specific example, the third lens group includes a plurality of lens sub-groups each configured to provide a different demagnification level.

In another embodiment, the lens system satisfies the following conditions (1) and (2):

$$0.9 < f/\# < 1.1 \qquad (1)$$

$$0.9 < RI < 1.0 \qquad (2)$$

where f/# and RI are focus number and relative illumination respectively, and both the f/# and the RI are obtained across a field of view at the image plane having a diameter that is less than or equal to about 26 mm. Both the f/# and RI are obtained for demagnification levels between 1.25× and 10×. In another implementation, the system includes a detector for imaging light received through the first and second lens groups and a shutter and/or iris for controlling light exposure time on a detector. The shutter and/or iris is positioned between the first lens group and the second lens group. Preferably, the shutter and/or iris is motorized.

In an alternative embodiment, a lens system is disclosed. The system includes, in order from a camera side, a first lens group and a second lens group. The lens system satisfies the following conditions (1) and (2):

$$0.9 < f/\# < 1.1 \qquad (1)$$

$$0.9 < RI < 1.0 \qquad (2)$$

where f/# and RI are focus number and relative illumination respectively, and both the f/# and the RI are obtained across a field of view at the image plane having a diameter less than or equal to about 26 mm. Both the f/# and RI are obtained for demagnification levels between 1.25× and 10×.

In yet another embodiment, an imaging system for capturing an image of a sample is disclosed. The imaging system includes an imaging box designed to prevent most light from entering an inside compartment of the box in which an object to be imaged may be placed and a lens system integrated within the imaging box through which light emitted from the object to be imaged passes. The lens system satisfies the following conditions (1) and (2):

$$0.9 < f/\# < 1.1 \quad (1)$$

$$0.9 < RI < 1.0 \quad (2)$$

where f/# and RI are focus number and relative illumination respectively, both the f/# and the RI are obtained across a field of view at the image plane having a diameter less than or equal to about 26 mm. Both the f/# and RI are obtained for demagnification levels between 1.25× and 10×. The imaging system further includes a detector for receiving the emitted light and generating an image of the object.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
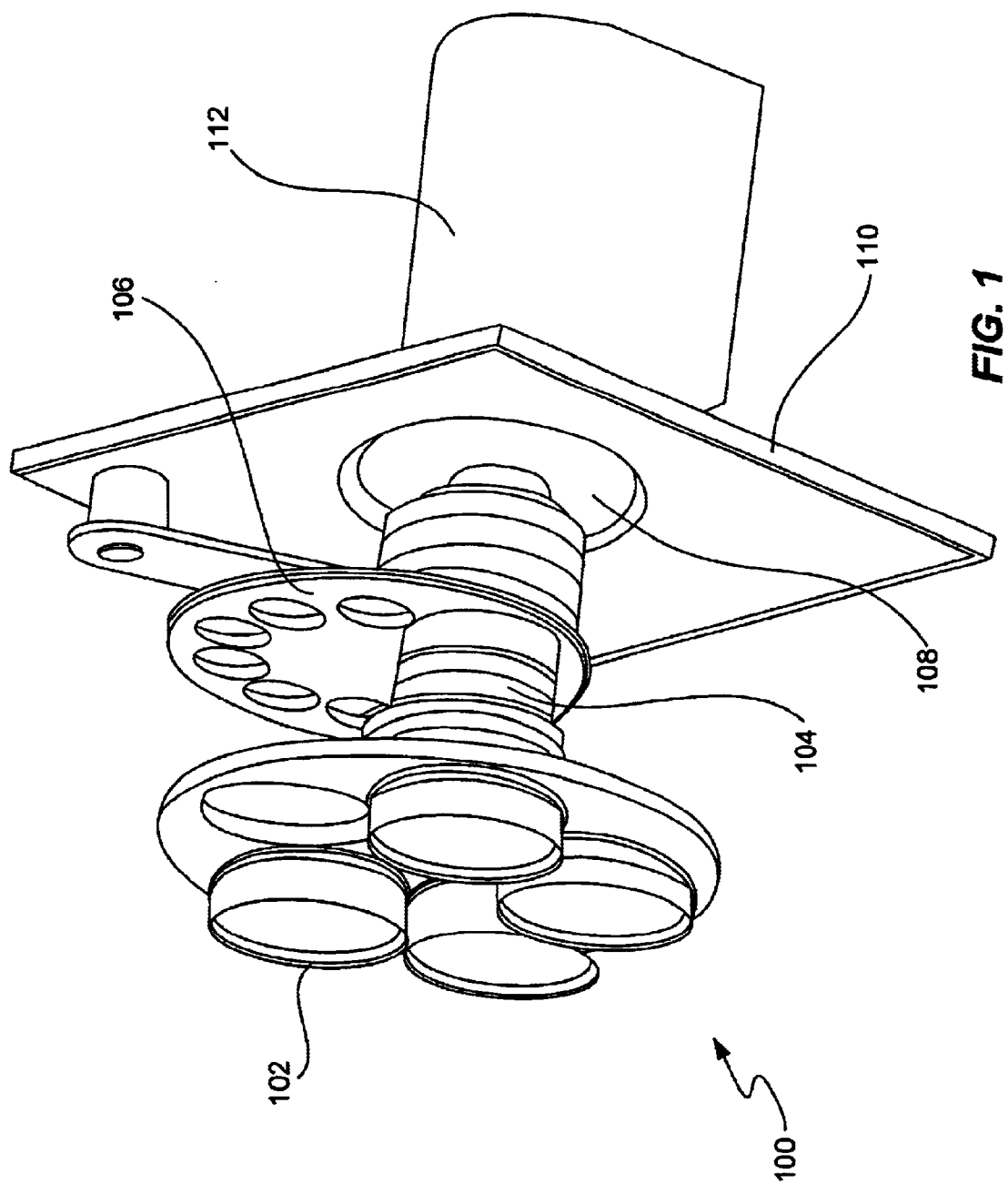
FIG. 1 is a perspective view of a lens system in accordance with one embodiment of the present invention.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terns, the present invention achieves a relatively high numerical aperture (NA) concurrently with a high relative illumination over a substantial portion of the focal plane (e.g., a 26 mm×26 mm charge coupled device (CCD)). A high NA relates inversely to a low focus number (f/#) since f/#=1/[2NA]. Preferably, the lens system of the present invention has an NA between about 0.4 and about 0.6 as measured at the image plane (i.e., at the focal plane) when the object-to-lens system distance is between about 40 mm and about 550 mm which corresponds to demagnification levels 1.25× and 10×. Said in another way, the lens system of the present invention has an f/# range between about 0.9 and about 1.1 as measured at the image plane (i.e., at the CCD plane) when the object-to-lens system distance is between about 40 mm and about 550 mm which correspond to demagnification levels between 1.25× and 10×.

The NA and f/# are generally related to the amount of light the lens can collect. It is important to note that conventional lenses have an f/# that is typically defined at infinity. That is, the f/# equals the focal length (f) of the lens using light coming from an infinitely distant object divided by the diameter of the lens (D). For example, although the Navitar f/0.95 50 mm lens is rated at f0.95 at infinity, it's f/# will actually be much higher at a relatively close object-to-lens system distance, such as the distances contemplated in the present invention. By way of example, the Navitar f/0.95 50 mm lens actually has an f/# of about 1.22 at an object-to-lens system distance of 220 mm.

Additionally, the lens system of the present invention also achieves a substantially flat relative illumination across the field of view. Relative illumination is generally the efficiency of light collection as a function of radius of the field of view. Preferably, the relative illumination or vignetting drops off less than about 10% across a field of view at the image plane having a diameter equal to or less than 26 mm and is obtained for demagnification levels between 1.25× and 10×. Preferably, the relative illumination (RI) is between about 100% and 97% (or 1.00 and 0.97) for such demagnification levels. In a specific implementation, about 97% RI is obtained for a field of view (FOV) diameter less than or equal to about 20 mm for demagnification levels between 1.25× and 10×. About 91% RI is obtained for a FOV diameter that is less than or equal to about 26 mm and demagnification levels between 1.25× and 10×. About 82% RI is obtained for a FOV diameter that is less than or equal to 31 mm and demagnification levels between 2.5× and 10× (74% RI is achieved for 1.25×). About 72% RI is obtained for a FOV diameter that is less than or equal to 36 mm and demagnification levels between 2.5× and 10× (45% RI is achieved for 1.25×). These RI results are compared to a conventional Navitar f/0.95 lens in the following table, where the object-to-lens system distance is about 160 mm to 470 mm (RI values are an approximate values):

| Lens Type | RI for a FOV diameter that is less than or equal to 20 mm | RI for a FOV diameter that is less than or equal to 26 mm | RI for a FOV diameter that is less than or equal to 31 mm | RI for a FOV diameter that is less than or equal to 36 mm |
| --- | --- | --- | --- | --- |
| Present Invention Lens System | 97% | 91% | 82% (74% for 1.25×) | 72% (45% for 1.25×) |

-continued

| Lens Type | RI for a FOV diameter that is less than or equal to 20 mm | RI for a FOV diameter that is less than or equal to 26 mm | RI for a FOV diameter that is less than or equal to 31 mm | RI for a FOV diameter that is less than or equal to 36 mm |
| --- | --- | --- | --- | --- |
| Navitar Lens System | 70% | 50% | 30% | 10% |

Additionally, the lens system preferably provides an image quality that is sufficient to differentiate low light level emission from closely adjacent areas of the object over the relevant portion of the field of view. That is, substantially all of the light from a particular field position falls within a prescribed small radius. In contrast, conventional systems tend to provide a core image that is formed from rays passing through the central part of the aperture and peripheral images that are formed from rays passing through the outer portion which flair out into a much larger radius. In one embodiment, the lens arrangement corrects chromatic aberrations having a wavelength between 450 nm and 700 nm. Preferably, the polychromatic RMS spot size is less than or equal to about 250 μm across a field of view (FOV) having a diameter of less than or equal to 26 mm for demagnification levels between 1.25× and 10×. The RMS spot size may be less than or equal to about 75μm for a demagnification level 5×, and 110μm for demagnification levels between 2.5× and 10×. RMS spot size is generally the amount of blur or average blur size of the image formed by the lens arrangement. Specifically, the RMS spot size value is a root mean square of the geometrically calculated rays of light that come in through the lens and focus on a particular spot having spot size that has 100% of the total input energy. Preferably, the distortion is less than about 3% across a FOV having a diameter less than or equal to about 26 mm and most preferably less than about 2%. Distortion is generally a measurement of how much the corners of an angled structure (e.g., a square) are "pillowed." Said in another way, the distortion is the amount of bowing that a perfect corner bows in or out.

Since costs of lens manufacturing is directly related to lens diameter, it is also preferable that the lens and filter diameters be kept within reasonable cost limits. In one embodiment, the lens preferably has a diameter that is less than or equal to about 160 mm and each filter preferably has a diameter that is less than or equal to about 80 mm. More preferably, each filter has a diameter that is less than or equal to about 60 mm.

The control of off axis aberrations and relative illumination is more difficult as the angular field of view decreases. Therefore, for a fixed NA, keeping the lens diameters relatively small becomes more difficult since an increase in lens size results in an increase in the angular field of view. For a fixed NA, the aberrations scale linearly with lens size. Additionally, for a fixed diameter field of view and fixed NA, the angular field of view increases as the size of the lens is reduced. However, the off-axis aberrations tend to increase as the square of the angular field. Accordingly, allowing larger lens diameters for a fixed NA and fixed diameter field of view makes it easier to correct the off axis aberrations and reduce the vignetting.

Any suitable detector may be utilized with the lens system of the present invention. By way of examples, a charge coupled device (CCD) camera Spectral Inst. 620 Series may be used to generate an image of an object. Preferably, the detector is sized to allow imaging of the entire field of view of the lens system. In one implementation illustrated below with respect to FIGS. 1 through 5, the detector size is 26 mm by 26 mm. Additionally, a fairly large back focal distance is preferably achieved. Preferably, the back focal distance is greater than about 10 mm, and most preferably, it is greater than about 14 mm. This relatively large back focal distance allows moisture build up to be controlled between the back lens and the CCD, for example, as required by many CCD manufacturers.

Since the lens is preferably being used to collect relatively low levels of light, the lens is preferably formed from a material that emits minimum florescence. Additionally, it is preferable that a significant space of collimated light is achieved for placement of such filters since particular types of filters are at peak performance for collimated light. The size of the desired collimated space depends on the size and number of filters to be used with the lens system. In the illustrated embodiment, two filters each having widths ranging from about 2.5 to 4.5 mm are contemplated. Thus, a collimated space for this embodiment is greater than about 25 mm. However, different collimated space sizes are desired for different filter sizes and numbers.

Any suitable lens arrangement may be designed to achieve some or all of the above design conditions. Most preferably, the lens arrangement achieves the above described f/# values at the above described object-to-lens system distances and corresponding demagnification levels. Additionally, it is also preferable, but not required, that the lens arrangement achieves the above described relative illumination (RI) values. Although not required, it is also preferable that the lens arrangement meets one or more of the remaining above described design conditions for detector size, aberration correction, RMS spot size or MTF, distortion, lens and filter sizes, and collimated space size. In an alternative embodiment, a lens system is adapted to meet the above described collimated space size requirements, and the other above listed requirements are optional (e.g., the above described f/# or RI requirements are optional).

FIG. 1 is a perspective view of a lens arrangement 100 in accordance with one embodiment of the present invention. This particular arrangement meets all of the above described conditions. The lens arrangement 100 was designed by starting with the lenses closest to CCD camera 112 and working back towards the object side. Accordingly, each lens group will be described starting at the CCD side and working back towards the object side. As shown, the lens arrangement 100 includes a first lens group 110, a shutter and iris 108, a plurality of filters 106, a second lens group 104, and a third lens group 102. The first and second lens group serve as a baseline optical system operating at 5× demagnification.

The first lens group 110 generally provides a relatively high NA (e.g., 0.5 in the illustrated embodiment) light gathering group that produces substantially collimated light in an extended region containing the aperture stop and one or more filters. Additionally, the first lens group 110 tends to flatten the field of view, partially correct color and monochromatic aberrations, and minimize the diameter and angular field of view in the filter space.

Figure 8:
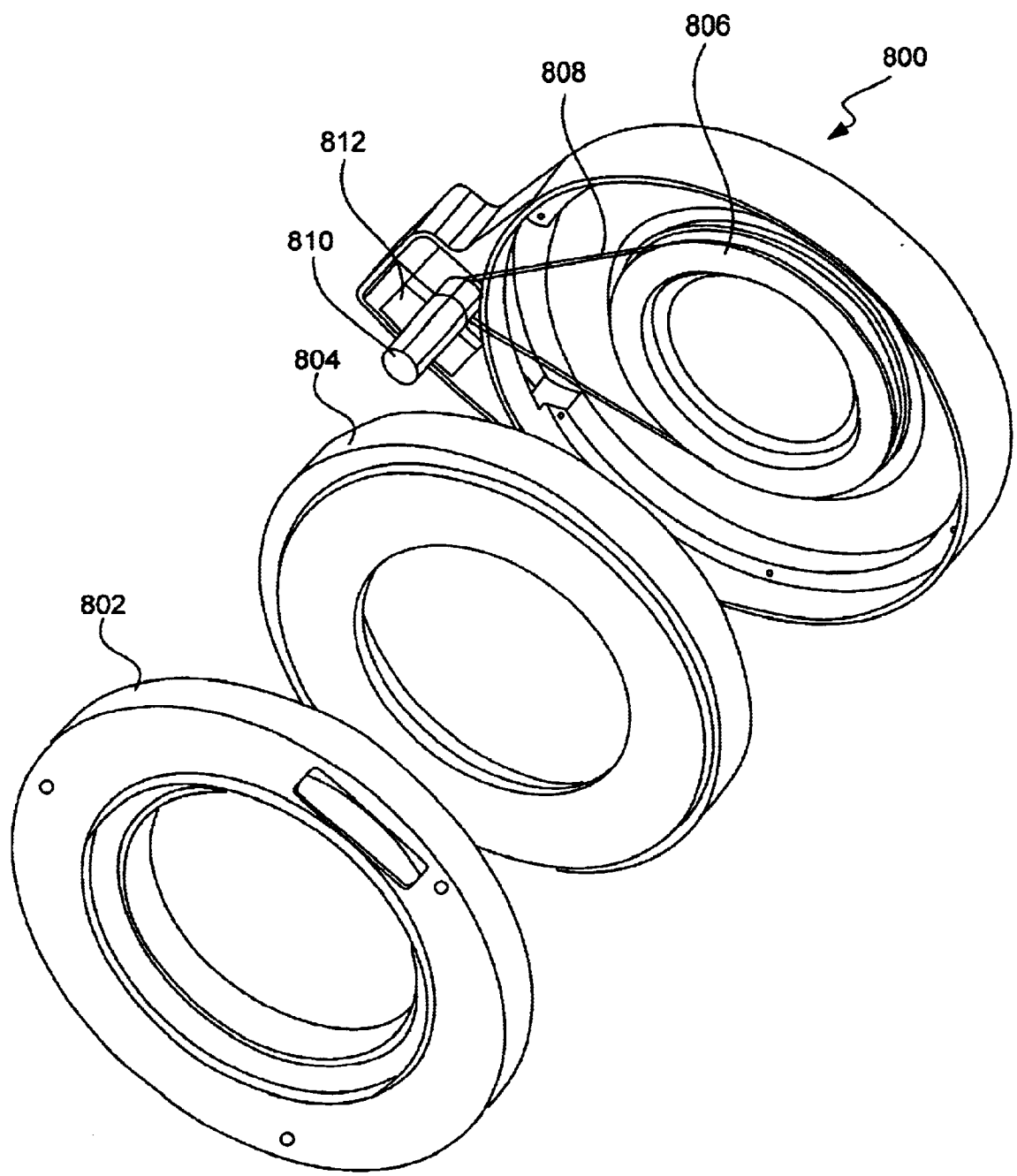
FIG. 8 is a cut away perspective view of a motorized shutter and iris assembly in accordance with one embodiment of the present invention.

The iris and shutter generally control the amount of light emitted from the object that impinges on the detector and the exposure time, respectively. Any suitable shutter or iris may be utilized. For example, a 04 UTS 205 available from Melles Griot of Irvine, Calif. may be used for the shutter. Preferably, the shutter's diameter is less than about 125 mm. The shutter and/or iris may also be motorized. FIG. 8 is a cut away perspective view of a motorized shutter and iris assembly 800 in accordance with one embodiment of the present invention. As shown, the assembly 800 includes a cover 802 that houses a shutter 804 and iris assembly (806, 808, 810, 812). The shutter may be any suitable commercially available shutter, such as the above mentioned Melles Griot shutter.

The iris assembly includes any suitable components for providing a motorized iris that preferably has a maximum aperture size less than or equal to about 65. Most preferably, the maximum diameter has a range between 45 and 65 mm. In one implementation, the maximum diameter is about 50 to 51 mm. Of course, the iris assembly may be configured for smaller size apertures. In the illustrated embodiment, the iris assembly 800 includes an iris 806, a belt 808, a motor 810, and a tension block 812. The motor drives the belt which thereby expands and contracts the iris 806. The motor may be any suitable type, such as a stepper motor, for driving the belt. Since the iris is relatively large, the iris leaves will have a relatively large friction load. Accordingly, the motor is selected to overcome the iris leaves' friction load. The tension block 812 correctly sets the belt's tension so that the belt does not slip or break.

Any number and type of filters may be placed in front of any of the lens of the system 100 of FIG. 1. However, filters are optional and not required in the present invention. In the illustrated embodiment, filters 106 are placed side by side between the shutter 108 and the second lens group 104. These filters 106 preferably include one or more interference filters. In one implementation, the filters 106 include two filter wheels that are arranged to slide out from between lens group 104 and 110. The filter wheels allow one to easily change the filters. The filters may be sensitive to the angle at which light hits them. If an absorption filter is only used, then a relatively wide angle may be used without causing any problems. However, if interference filters are used, the light preferably strikes the filter surface at as close to the same angle over the resulting field. In other words, there may be a limitation on the angle size of light through the filter space, which limitation depends on the filter type. For example, the angle size is required to be substantially collimated for interference type filters. Additionally, there is a diameter maximum for this filter space that depends on the availability of filters and their associated diameters. Meeting these two requirement (i.e., optical angle and diameter of filter space) for the system 100 of FIG. 1 resulted in a substantially large space of collimated light into which one can insert the filters 106. In the illustrated embodiment, the second and third lens groups 104 and 102 provide a collimated light space having a size of about 25 mm.

The second lens group 104 in conjunction with the first lens group 110 corrects aberrations, such as primary and higher order of aberrations (e.g., coma, chromatic, astigmatism, etc.). The second lens group 104 also serves to focus the light to form an image 5x the size of the CCD.

Relatively simple auxiliary lens sets (i.e., lens group 102) may be placed in front of the second lens group 104, and the object distance may be varied to achieve different demagnification levels without affecting the basic performance characteristics of the system. For instance, at the CCD, the NA, and therefore the image brightness, remains unchanged as the demagnification changes. In the illustrated embodiment, demagnification levels of 1.25x, 2.5x, 7.5x, and 10.0x are provided in the form of a demagnification turret (i.e., 102), in addition to the 5x baseline demagnification level. The turret rotatably provides the different demagnification levels. Said in another way, zoom lens elements 104 are rotatable into or out of the optical path. Alternatively, a conventional zoom lens may be utilized to provide a continuous range of demagnification levels. In one implementation, a movable stage is provided to move the object being imaged into a fixed focal plane. That is, the lens system 100 remains stationary and the object moves to thereby focus the objects. Of course, the one or more lenses of the lens system 100 may be movable to focus the object being imaged.

Figure 2:
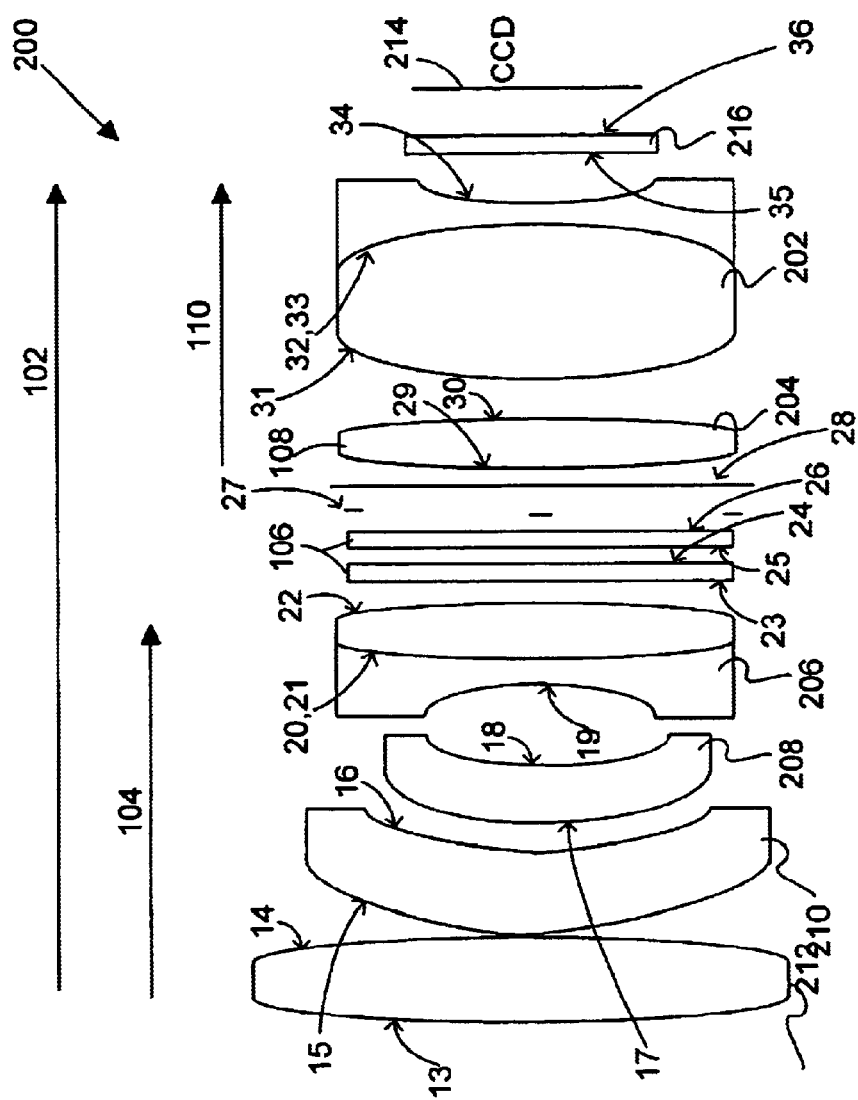
FIG. 2 is a side view of a 5× setting for the lens system of FIG. 1 in accordance with one embodiment of the present invention.

FIG. 2 is a side view diagrammatic representation of the lenses used within the lens arrangement 100 of FIG. 1 set at a demagnification of 5x in accordance with one embodiment of the present invention. As shown, the first lens group 110 includes a meniscus doublet 202 and a biconvex lens 204 that produce substantially collimated light in an extended region that is about 25 mm and includes the aperture stop and two filter wheels. The doublet 202 has a steeply curved high index air-glass surface concave towards the CCD that tends to flatten the field of view, preliminarily correct color and partially collimate the light. The biconvex lens 204 completes the collimation and works together with doublet 202 to partially correct monochromatic aberrations and minimize the diameter and angular field of view in the filter space.

An aperture stop or f-stop ring 201 for constraining the amount of light that passes from the object to the detector is provided between the shutter 108 and the second lens group 104. The aperture stop may be adjusted in any suitable manner, e.g., manually or motorized.

The second lens group 104 includes a meniscus doublet 206, two meniscus singlets 208 and 210, and a biconvex lens 212 which work together to complete the aberration correction and focus the light to form an image (the object as the system is actually used) 5x the size of the CCD. Preferably, the first and second lens group has a clear aperture dimater between 95 and 120 mm.

The third lens group 102 is positioned so that no other lenses are provided between the object and the second lens group 104 to thereby achieve a 5x demagnification of such object. That is, the first and second lens group alone provide 5x demagnification The specific parameters for the lenses of the "baseline" first and second lens groups 110 and 104 are provided in the following table (the symbol "~" denotes an approximate value):

TABLE 1

Prescription for the "base" first and second lens groups having a 5x demagnification

| Surf. No. | Note | Surface Radius (mm) | Thickness/ spacing following surface (mm) | Refractive index $N_d$, Abbe. No. $V_d$ |
|---|---|---|---|---|
| 0 | Object | — | 231.79 | Air |
| 1 | Window | — | — | Air |
| 2 | | — | 6.00 | 1.5168, 64.2 |
| 3 | | — | 73.70 | Air |
| 13 | | 193.97 | 18.00 | 1.6510, 56.2 |
| 14 | | −976.60 | 0.50 | Air |
| 15 | | 87.09 | 16.00 | 1.6511, 55.9 |
| 16 | | 389.20 | 0.50 | Air |
| 17 | | 51.40 | 11.22 | 1.4875, 70.4 |
| 18 | | 37.00 | 23.44 | Air |
| 19 | | −55.30 | 3.50 | 1.7847, 26.1 |

TABLE 1-continued

Prescription for the "base" first and second lens groups having a 5× demagnification

| Surf. No. | Note | Surface Radius (mm) | Thickness/ spacing following surface (mm) | Refractive index $N_d$, Abbe. No. $V_d$ |
|---|---|---|---|---|
| 20 | Cement | 56.14 | 0.01 | ~1.52, — |
| 21 |  | 56.14 | 21.00 | 1.7440, 44.8 |
| 22 |  | −89.43 | 2.00 | Air |
| 23 | FltrWh1#1 | — | 4.00 | 1.5168, 64.2 |
| 24 |  | — | 2.00 | Air |
| 25 | FltrWh1#2 | — | 4.00 | Air |
| 26 | ShownEmpty | — | 11.317 | Air |
| 27 | Iris 51 mm Dia. | — | 4.52 | Air |
| 28 | Shutter | — | 1.50 | Air |
| 29 |  | 166.19 | 14.00 | 1.7440, 44.8 |
| 30 |  | −112.47 | 0.50 | Air |
| 31 |  | 45.19 | 32.00 | 1.7440, 44.8 |
| 32 | Cement | −62.74 | 0.01 | ~1.52, — |
| 33 |  | −62.74 | 3.37 | 1.7847, 26.1 |
| 34 |  | 50.59 | 5.54 | Air |
| 35 | CCD Window | — | 3.175 | 1.4585, 67.8 |
| 36 |  | — | 10.00 | Air |
| IMS | CCD | — | — |  |

Where there is no surface radius specified, the surface is not optically significant (e.g., it is flat).

Figure 3:
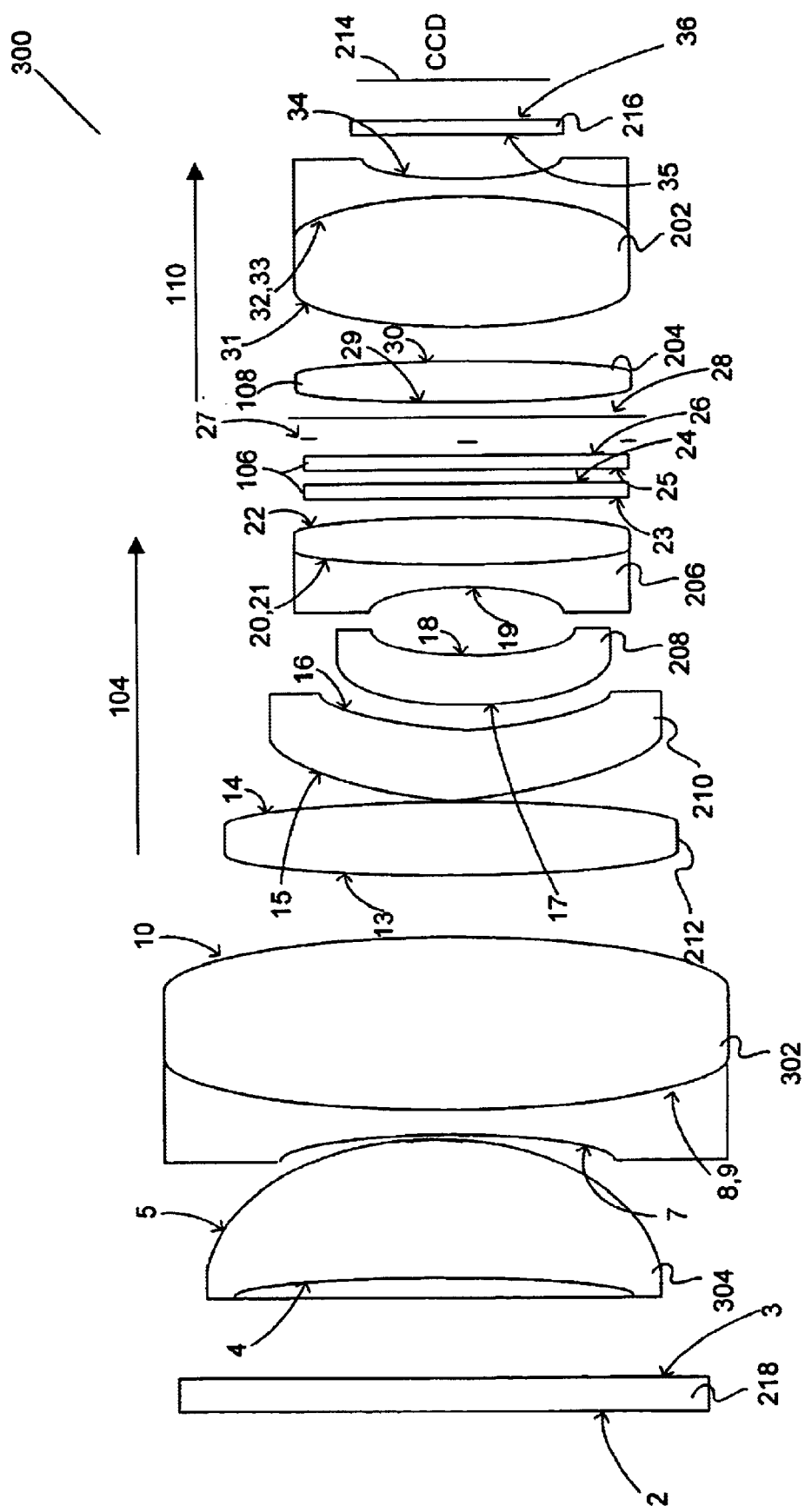
FIG. 3 is a side view of a 1.25× setting for the lens system of FIG. 1 in accordance with one embodiment of the present invention.

FIG. 3 is a side view diagrammatic representation of the lenses used within the lens arrangement 100 of FIG. 1 set at a demagnification of 1.25× in accordance with one embodiment of the present invention. As shown, the third lens group 102 is positioned so that a doublet 302 and a singlet 304 that are inserted between the second lens group 104 and the object to achieve a 1.25× demagnification. The doublet and singlet have a positive power so as to converge the light. The specific parameters for the doublet 302 and singlet 304 are provided in the following table:

TABLE 2

Prescription for doublet 302 and singlet 304 which combined with "base" first and second lens groups have a 1.25× demagnification

| Surf. No. | Note | Surface Radius (mm) | Thickness/ spacing following surface (mm) | Refractive index $N_d$, Abbe. No. $V_d$ |
|---|---|---|---|---|
| 0 | Object |  | 28.73 | Air |
| 2 | Window |  | 6.00 | 1.5168, 64.2 |
| 3 |  |  | 15.45 | Air |
| 4 | Hard Aperture 84 mm Dia. | −227.53 | 23.34 | 1.6511, 55.9 |
| 5 |  | −62.74 | 0.50 | Air |
| 7 |  | −193.97 | 5.00 | 1.7847, 26.1 |
| 8 | Cements | 171.20 | 0.01 | ~1.52, — |
| 9 |  | 171.20 | 29.40 | 1.6511, 55.9 |
| 10 |  | −101.28 | 5.00 | Air |

Figure 4:
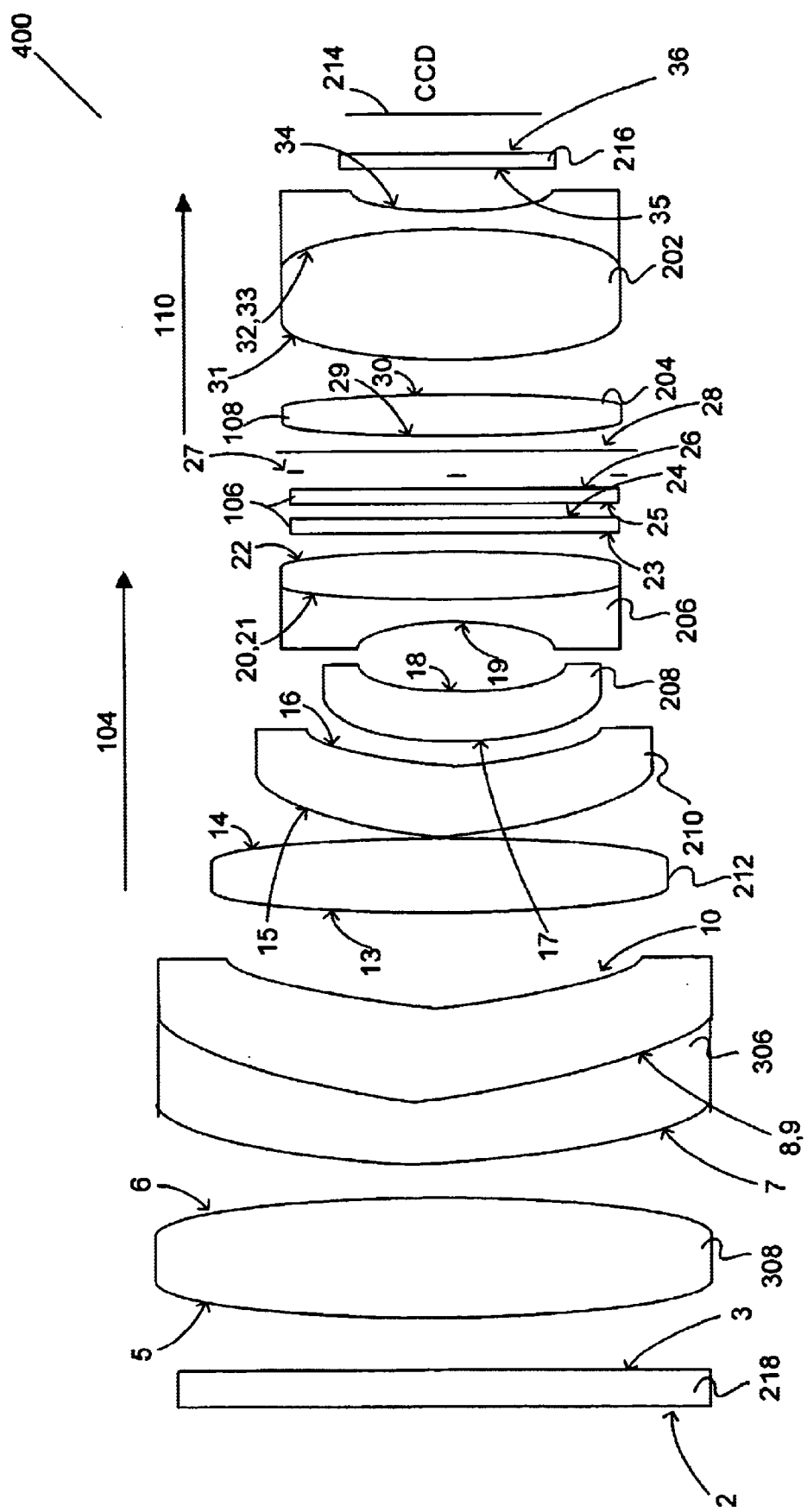
FIG. 4 is a side view of a 2.5× setting for the lens system of FIG. 1 in accordance with one embodiment of the present invention.

FIG. 4 is a side view diagrammatic representation of the lenses used within the lens arrangement 100 of FIG. 1 set at a demagnification of 2.5× in accordance with one embodiment of the present invention. A doublet 306 and a singlet 308 are inserted between the second lens group 104 and the object to achieve a 2.5× demagnification. Similar to the 1.25× set of lenses, the 2.5× set of lenses have a positive power so as to converge the light. The specific parameters for the doublet 306 and singlet 308 are provided in the following table:

TABLE 4

Prescription for doublet 306 and singlet 308 which combined with "base" first and second lens groups have a 2.5× demagnification

| Surf. No. | Note | Surface Radius (mm) | Thickness/ spacing following surface (mm) | Refractive index $N_d$, Abbe. No. $V_d$ |
|---|---|---|---|---|
| 0 | Object |  | 134.92 | Air |
| 2 | Window |  | 6.00 | 1.5168, 64.2 |
| 3 |  |  | 6.02 | Air |
| 5 |  | 287.20 | 25.00 | 1.5168, 64.2 |
| 6 |  | −206.30 | 0.50 | Air |
| 7 |  | 116.98 | 10.05 | 1.7847, 26.1 |
| 8 | Cement | 82.50 | 0.01 | ~1.52, — |
| 9 |  | 82.50 | 18.00 | 1.4875, 70.4 |
| 10 |  | 110.31 | 19.12 | Air |

Figure 5:
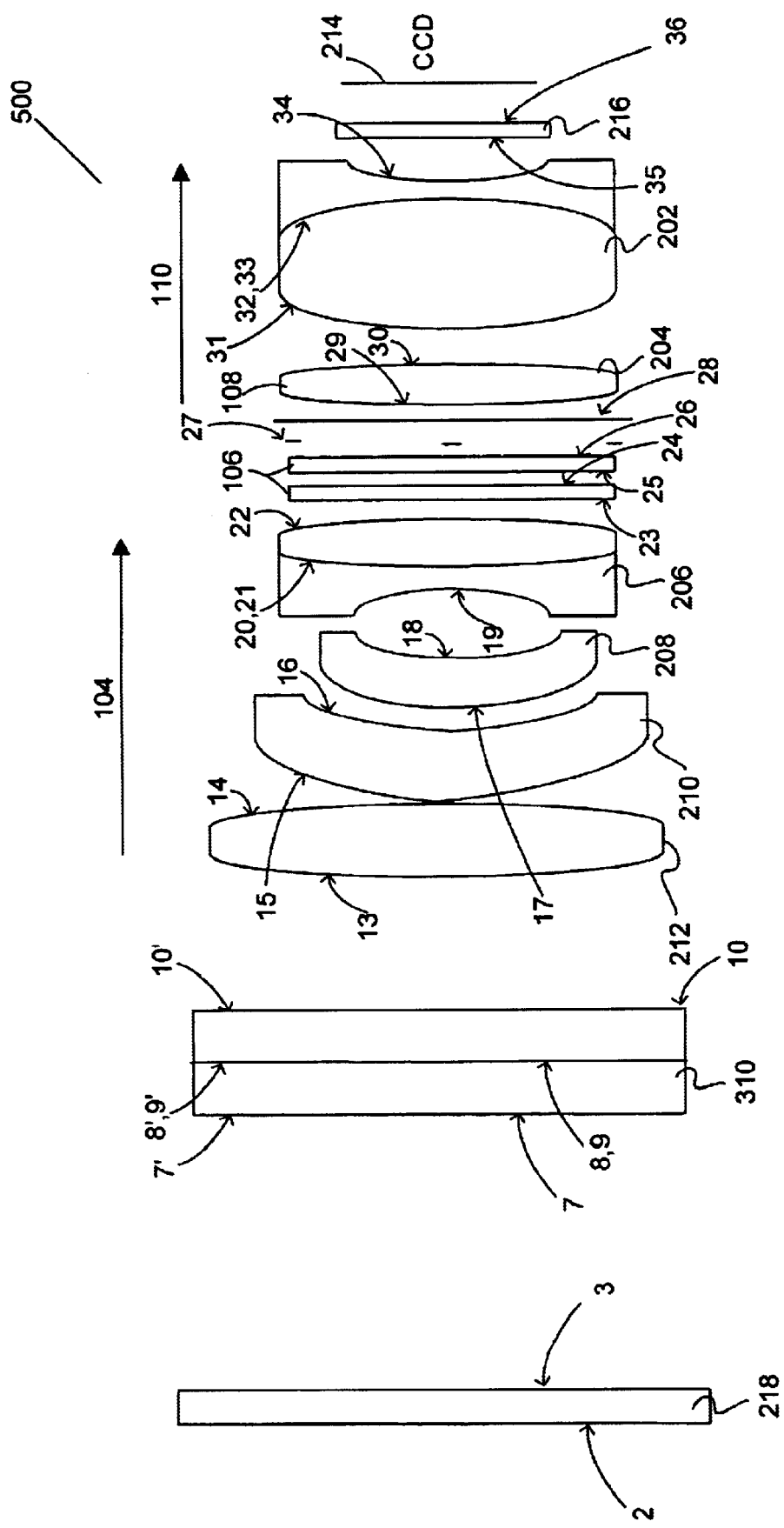
FIG. 5 is a side view of a 7.5× or 10.0× setting for the lens system of FIG. 1 in accordance with one embodiment of the present invention.

FIG. 5 is a side view diagrammatic representation of the lenses used within the lens arrangement 100 of FIG. 1 set at a demagnification of 7.5× and 10× in accordance with one embodiment of the present of the present invention. A negative doublet 310 is inserted between the second lens group 104 and the object to achieve a relatively high demagnification. The doublet 310 diverge the light while maintaining the aberration correction imposed by the first and second lens groups. The specific parameters for the doublet 310 for the 7.5× demagnification is provided in the following Table 4:

TABLE 4

Prescription for doublet 310 which combined with "base" first and second lens groups have a 7.5× demagnification

| Surf. No. | Note | Surface Radius (mm) | Thickness/ spacing following surface (mm) | Refractive index $N_d$, Abbe. No. $V_d$ |
|---|---|---|---|---|
| 0 | Object | — | 381.34 | Air |
| 2 | Window | — | 6.00 | 1.5168, 64.2 |
| 3 |  | — | 51.69 | Air |
| 7 |  | −581.35 | 11.00 | 1.7847, 26.1 |
| 8 | Cement | −408.10 | 0.01 | ~1.52, — |
| 9 |  | −408.10 | 8.00 | 1.5168, 64.2 |
| 10 |  | 1.3170e+03 | 8.00 | Air |

The specific parameters for the doublet 310 for the 10.0× demagnification is provided in the following Table 5:

TABLE 5

Prescription for doublet 310 which combined with "base" first and second lens groups have a 10.0× demagnification

| Surf. No. | Note | Surface Radius (mm) | Thickness/ spacing following surface (mm) | Refractive index $N_d$, Abbe. No. $V_d$ |
|---|---|---|---|---|
| 0 | Object |  | 520.80 | Air |
| 2 | Window |  | 6.00 | 1.5168, 64.2 |
| 3 |  |  | 51.69 | Air |
| 7' |  | −441.52 | 11.00 | 1.7847, 26.1 |
| 8' | Cement | −295.69 | 0.01 | ~1.52, — |
| 9' |  | −295.69 | 8.00 | 1.5168, 64.2 |
| 10' |  | 693.50 | 8.00 | Air |

Figure 6A:
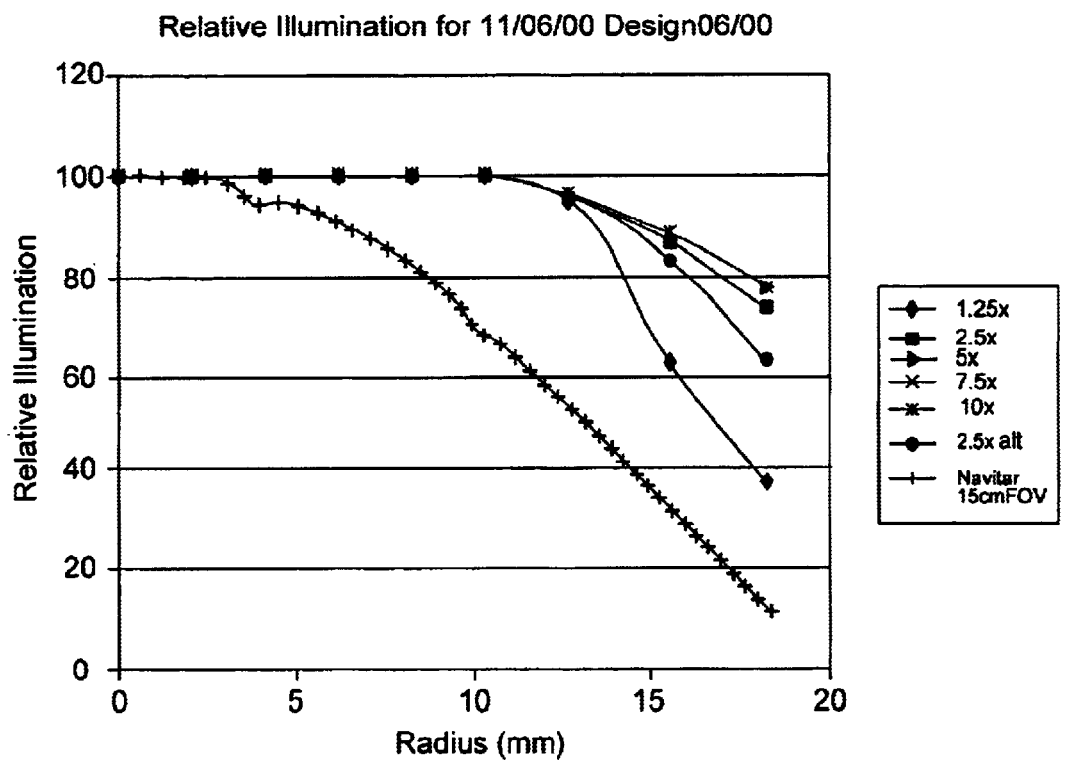
FIG. 6A is a comparative graph showing relative illumination as a function of radius for a conventional lens system and the lens system of FIG. 1.

FIG. 6A is a comparative graph showing relative illumination as a function of radius for a conventional lens system and the lens system of FIG. 1. The relative illumination's units are in percentage values and the radius' units are in millimeters. As shown, the Navitar 15 cm FOV provides a poor relative illumination over the higher radii as compared to the lens system of the present invention. For example, when the lens system 100 is set at 7.5×, a relative illumination of about 90% is provided at about a radius of 15 mm. In contrast, the Navitar 15 cm FOV provides about 37% at the same radius.

Figure 6B:
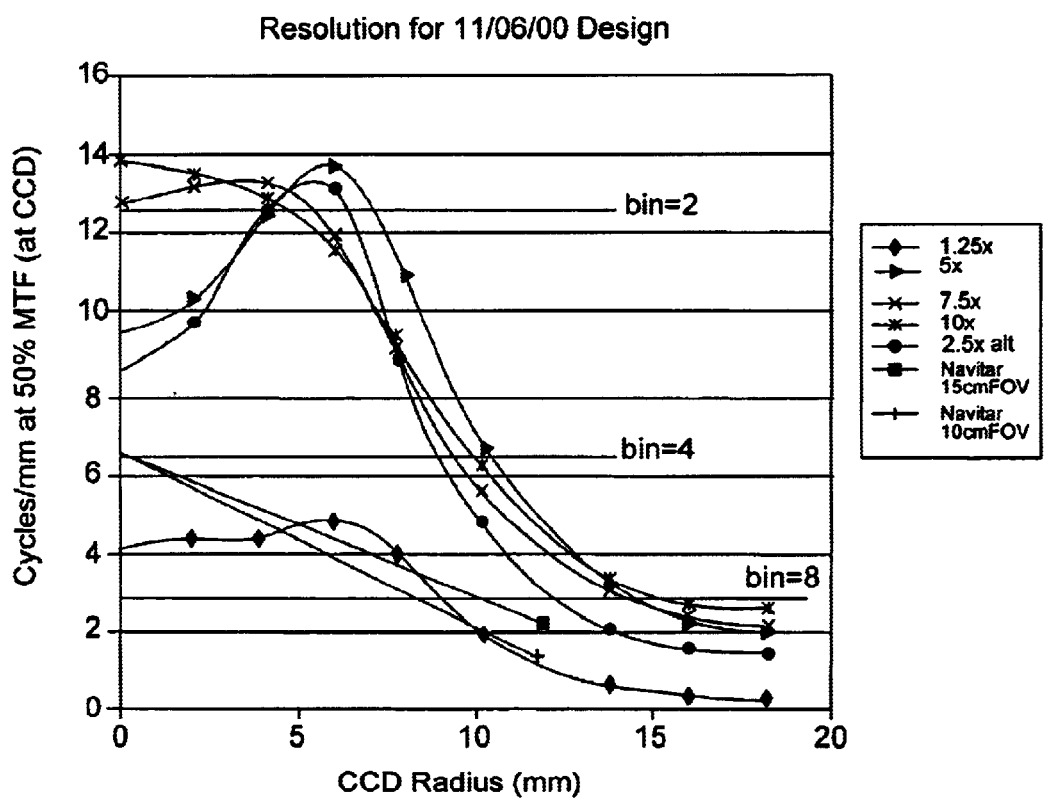
FIG. 6B is a comparative graph showing spatial frequency resolution at 50% contrast as a function of CCD radius for a conventional lens system and the lens system of FIG. 1.

FIG. 6B is a comparative graph showing spatial frequency resolution at 50% contrast as a function of CCD radius for a conventional lens system and the lens system of FIG. 1. The units for the resolution are in cycles per mm and the units for the CCD radius are in millimeters. This figure shows that the 7.5× lens of the present invention has about twice the resolution (i.e., 12 lines per mm) as the Navitar lens resolution of (i.e., 6 lines per mm).

The lens system 100 may be utilized for any suitable application that requires low light imaging. For example, the lens system may be integrated into a light tight box into which a light emitting object may be placed and imaged. Several embodiments of such a system are described in co-pending U.S. patent application, having application Ser. No. 09/795,056, entitled IMPROVED IMAGING APPARATUS, filed Feb. 21, 2001, by Michael D. Cable et al., which application is incorporated herein by reference in its entirety.

Figure 7:
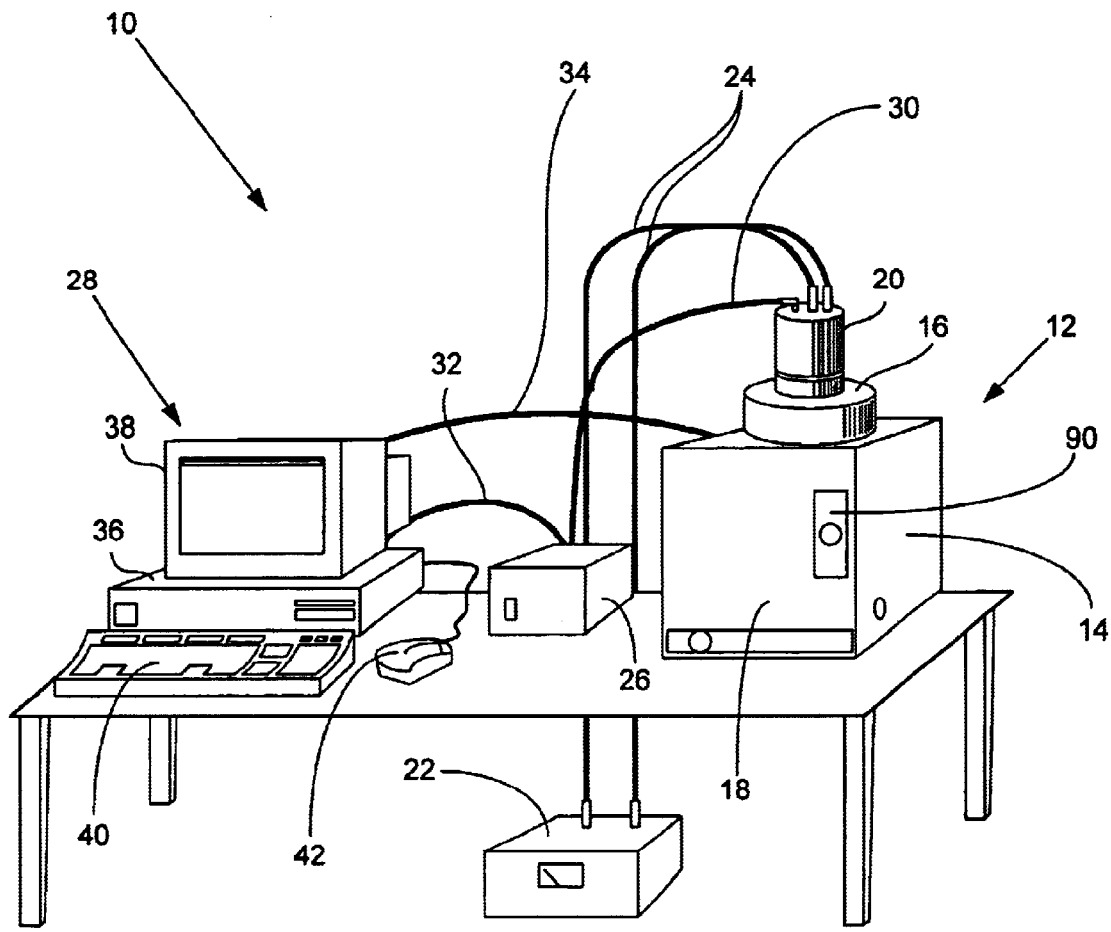
FIG. 7 is a perspective view of an imaging system including an imaging box in accordance with one embodiment of the present invention.

FIG. 7 illustrates an imaging system 10 configured to capture photographic and luminescence images in accordance with one embodiment of the present invention. The imaging system 10 may be used for imaging a low intensity light source, such as luminescence from luciferase-expressing cells, fluorescence from fluorescing molecules, and the like. The low intensity light source may be emitted from any of a variety of light-emitting samples which may include, for example, tissue culture plates, multi-well plates (including 96, 384 and 864 well plates), and animals or plants containing light-emitting molecules, such as various mammalian subjects such as mice containing luciferase expressing cells.

The imaging system 10 comprises an imaging box 12 adapted to receive a light-emitting sample in which low intensity light, e.g., luciferase-based luminescence, is to be detected. The imaging box 12 includes an upper housing 16 in which a lens system of the present invention is mounted. A high sensitivity camera, e.g., an intensified or a charge-coupled device (CCD) camera 20 is positioned on top of the imaging box 13 and positioned above, the upper housing 16. The CCD camera 20 is capable of capturing luminescent and photographic (i.e., reflection based images) images of the sample within the imaging box 12. The CCD camera 20 is cooled by a suitable source such as a refrigeration device 22 that cycles a cryogenic fluid through the CCD camera via conduits 24. A suitable refrigeration device is the "CRYOTIGER" compressor, which can be obtained from IGC-APD Cryogenics Inc., Allentown, Pa. Other methods, such as liquid nitrogen, may be used to cool the CCD camera 20.

An image processing unit 26 optionally interfaces between camera 20 and a computer 28 through cables 30 and 32 respectively. The computer 28, which may be of any suitable typo, typically comprises a main unit 36 that typically contains hardware including a processor, memory components such as random-access memory (RAM) and read-only memory (ROM), and disk drive components (e.g., hard drive, CD, floppy drive, etc.). The computer 28 also includes a display 38 and input devices such as a keyboard 40 and mouse 42. The computer 28 is in communication with various components in the imaging box 12 via cable 34.

To provide communication and control for these components, the computer 28 includes suitable processing hardware and software configured to provide output for controlling any of the devices in the imaging box 12. The processing hardware and software may include an I/O card, control logic for controlling any of the components of the imaging system 10, and a suitable graphical user interface for the imaging system 10. The computer 28 may also include suitable processing hardware and software for the camera 20 such as additional imaging hardware, software, and image processing logic for processing information obtained by the camera 20. Components controlled by the computer 28 may include the camera 20, the motors responsible for camera 20 focus, the motors responsible for position control of a platform supporting the sample, the camera lens, f-stop, etc. The logic in computer 28 may take the form of software, hardware or a combination thereof. The computer 28 also communicates with a display 38 for presenting imaging information to the user. By way of example, the display 38 may be a monitor, which presents an image measurement graphical user interface (GUI) that allows the user to view imaging results and also acts as an interface to control the imaging system 10.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A finite conjugate lens system, comprising, in order from a from a camera side to an object side:

a first lens group;

a second lens group; and a third lens group configured to provide a plurality of demagnification levels, wherein the first and/or second lens groups are adapted so that when light is passed from the object side to the image side, a substantially sized region of collimated light is formed between the first and second lens group, wherein the lens system satisfies the following conditions (1) and (2):

$$0.9 < f/\# < 1.1 \quad (1)$$

$$0.90 < RI < 1.00 \quad (2)$$

where f/# and RI are focus number and relative illumination respectively, both the f/# and the RI being obtained across a field of view at an image plane at the camera side having a diameter greater than or equal to 26 mm, and both the f/# and RI being obtained for the plurality of demagnification levels.

2. A lens system as recited in claim 1, wherein the first and second lens groups are adapted to demagnify an object at the object side.

3. A lens system as recited in claim 1, wherein the region of collimated light space is greater than about 25 mm.

4. A lens system as recited in claim 1, wherein the region of collimated light space is adapted to receive one or more filter wheel(s).

5. A lens system as recited in claim 1, wherein the first and second lens groups are configured to provide a field of view at an image plane at the camera side having a diameter that is greater than 26 mm over which vignetting is less than or equal to 10%.

6. A lens system as recited in claim 1, wherein the demagnification levels include a demagnification level less than or equal to 10×.

7. A lens system as recited in claim 6, wherein the third lens group includes a plurality of lens sub-groups mounted on a turret.

8. A lens system as recited in claim 6, wherein the third lens group includes a plurality of lens sub-groups each configured to provide a different demagnification level.

9. A lens system as recited in claim 1, wherein the demagnification levels include a range of demagnification levels between about 1.25 and 10×.

10. A lens system as recited in claim 1, wherein the lens system is adapted for imaging light received through the first and second lens group.

11. A lens system as recited in claim 10, further comprising a detector for imaging light received through the first and second lens groups.

12. A lens system as recited in claim 11, wherein the detector is a charge coupled device (CCD) camera.

13. A lens system as recited in claim 11, further comprising a shutter and/or iris for controlling light exposure time on the detector.

14. A lens system as recited in claim 13, wherein the shutter and/or iris is positioned between the first lens group and the second lens group.

15. A lens system as recited in claim 13, wherein the shutter and/or iris is motorized.

16. A lens system as recited in claim 13, wherein the shutter has a diameter less than or equal to about 125 mm.

17. A lens system as recited in claim 16, wherein the iris has a maximum diameter that is less than or equal to about 65 mm.

18. A lens system as recited in claim 17, wherein the iris has a maximum diameter that has a range between about 45 and 65 mm.

19. A lens system as recited in claim 18, wherein the iris has a maximum diameter that is about 51 mm.

20. A lens system as recited in claim 11, wherein the detector has a size that is about 26 by 26 mm.

21. A lens system as recited in claim 11, wherein a back focal distance associated with the first lens group and the detector is greater than or equal to 14 mm.

22. A lens system as recited in claim 1, wherein the first and second lens group are configured to correct chromatic aberrations having a wavelength between 450 nm and 700 nm.

23. A lens system as recited in claim 1 having an associated polychromatic RMS (root mean square) spot radius that is less than or equal to 250 $\mu$m across a 26 mm diameter field of view.

24. A lens system as recited in claim 1 having a distortion value less than about three percent across a 26 mm diameter field of view.

25. A lens system as recited in claim 1, wherein the first and second lens group are formed from materials that emit minimum fluorescence.

26. A lens system as recited in claim 1, wherein the first and second lens group have a maximum lens clear aperture of between 95 mm to 120 mm.

27. A lens system as recited in claim 1, wherein in order from the camera side to the object side, the first lens group comprises a meniscus doublet and a biconvex lens, the second lens group comprises meniscus doublet, two meniscus singlets, and a biconvex lens.

28. A lens system as recited in claim 27, the third lens group comprising, in order from the camera side to the object side, a doublet and a singlet, the third lens group being adapted to provide a demagnification level of either 1.25× or 2.5×.

29. A lens system as recited in claim 27, the third lens group comprising, in order from the camera side to the object side, a negative doublet, wherein the third lens group is adapted to provide a demagnification level of either 7.5× or 10×.

30. A lens system comprising, in order from a camera side, a first lens group and a second lens group, wherein the lens system satisfies the following conditions (1) and (2):

$$0.9 < f/\# < 1.1 \tag{1}$$

$$0.90 < RI < 1.00 \tag{2}$$

where f/# and RI are focus number and relative illumination respectively, both the f/# and the RI being obtained across a field of view at an image plane at the camera side having a diameter greater than or equal to 26 mm, and both the f/# and RI being obtained for demagnifications of 1.25 through 10×.

31. A lens system as recited in claim 30, further comprising a detector for imaging light received through the first and second lens group.

32. A lens system as recited in claim 31, wherein the detector is a charge coupled device (CCD) camera.

33. A lens system as recited in claim 31, further comprising a shutter and/or iris for controlling light exposure time on the detector.

34. A lens system as recited in claim 33, wherein the shutter and/or iris is positioned between the first lens group and the second lens group.

35. A lens system as recited in claim 33, wherein the shutter and/or iris is motorized.

36. A lens system as recited in claim 33, wherein the shutter and/or iris has a diameter less than about 26 mm.

37. A lens system as recited in claim 31, wherein the detector has a size that is about 26 by 26 mm.

38. A lens system as recited in claim 31, wherein a back focal distance associated with the first lens group and the detector is greater than or equal to 14 mm.

39. A lens system as recited in claim 30, wherein the first and second lens group are configured to correct chromatic aberrations having a wavelength between 450 nm and 700 nm.

40. A lens system as recited in claim 30 having an associated polychromatic RMS (root mean square) spot radius that is less than or equal to 250 $\mu$m across a 26 mm diameter field of view.

41. A lens system as recited in claim 30 having a distortion value less than about three percent across a 26 mm diameter field of view.

42. A lens system as recited in claim 30, wherein the first and second lens group are formed from materials that emit minimum fluorescence.

43. A lens system as recited in claim 30, wherein the first and second lens group have a maximum lens clear aperture of between 95 mm to 120 mm.

44. A lens system as recited in claim 30, wherein the first lens group provides a substantially sized collimated light space between the first lens group and the second lens group.

45. A lens system as recited in claim 44, wherein the collimated light space is greater than about 25 mm.

46. A lens system as recited in claim 44, further comprising one or more filters positioned within the substantially collimated space.

47. A lens system as recited in claim 46, wherein the one or more filters are each a filter wheel that is movable into and out from a position between the first and second lens group.

48. A lens system as recited in claim 46, wherein each filter has a diameter that is between about 50 and 60 mm.

49. A lens system as recited in claim 30, further comprising one or more filters.

50. A lens system as recited in claim 30, further comprising a third lens group for providing a plurality of demagnification levels.

51. A lens system as recited in claim 50, wherein the third lens group is a rotable turret having a discreet number of demagnification lens groups, each demagnification lens group having a predefined demagnification characteristic and being positionable between the second lens group and the object side.

52. A lens system as recited in claim 51, wherein the demagnification lens groups include a plurality of associated demagnification levels selected from a group consisting of a 1.25×, 2.5×, 5.0×, 7.5×, and 10.0× demagnification level.

53. An imaging system for capturing an image of a sample, the imaging system comprising:

an imaging box designed to prevent most light from entering an inside compartment of the box in which an object to be imaged may be placed;

a lens system integrated within the imaging box through which light emitted from the object to be imaged passes, wherein the lens system satisfies the following conditions (1) and (2):

$$0.9 < f/\# < 1.1 \quad (1)$$

$$0.90 < RI < 1.00 \quad (2)$$

where f/# and RI are focus number and relative illumination respectively, the f/# being obtained at an image plane at the camera side, the RI being obtained across a field of view having a diameter greater than or equal to 26 mm, both the f/# and RI being obtained for demagnifications of −1.25 through −10×, and a detector for receiving the emitted light and generating an image of the object.

54. An imaging system as recited in claim 53, further comprising an f-stop adjustment mechanism for adjusting an f-stop associated with the lens system.

55. An imaging system as recited in claim 53, wherein the lens system includes a plurality of selectable filters, the imaging system further comprising a filter adjustment mechanism for selecting one or more filters to be used with the lens system when imaging the object.

56. An imaging system as recited in claim 53, wherein the imaging box includes a stage on which the object may be placed and a motor for moving the stage.

57. An imaging system as recited in claim 53, wherein the detector is a CCD camera.

58. An imaging system as recited in claim 57, further comprising a cooling system arranged to cool the CCD camera.

* * * * *